United States Patent [19]

Severt

[11] 4,294,440
[45] Oct. 13, 1981

[54] HOLDING DEVICE

[76] Inventor: Wilhelm Severt, Venn Diek 21, 4426 Vreden, Fed. Rep. of Germany

[21] Appl. No.: 83,445

[22] Filed: Oct. 10, 1979

[51] Int. Cl.³ .............................................. B23Q 1/04
[52] U.S. Cl. .................................................... 269/71
[58] Field of Search ................. 269/17, 71, 73, 60–61, 269/58, 74, 82–85, 321 A, 900

[56] References Cited

U.S. PATENT DOCUMENTS

| | | | |
|---|---|---|---|
| 2,782,661 | 2/1957 | Lewis ................................ | 269/73 X |
| 3,218,056 | 11/1965 | Kaplan et al. ..................... | 269/17 X |
| 4,067,562 | 1/1978 | Weber ................................ | 269/71 |

FOREIGN PATENT DOCUMENTS 2413024  2/1975  Fed. Rep. of Germany ........ 269/71

Primary Examiner—Robert C. Watson

Attorney, Agent, or Firm—Jordan and Hamburg

[57] ABSTRACT

To enable heavy workpieces to be orientated into any desired position without re-clamping, more particularly for welding seams horizontally from above, as is most favorable, a clamping plate or table (3) is pivoted for unrestricted rotation about an axis (5) at the free end of a cantilever arm (2) supported from a stand (1) for rotation about a horizontal axis (13) by flange elements (14, 15) which are adjustable with respect to one another in two directions at right angles to balance a workpiece and the cantilever, table assembly with reference to the axis (13). Electric motor drives (7 and 12) controlled by limit switches may be used to selectively rotate the table and the cantilever arm to bring a workpiece into any desired orientation. A construction in which the cantilever (2) is replaced by a beam extending two end frames like the stand (1) is also described.

3 Claims, 3 Drawing Figures

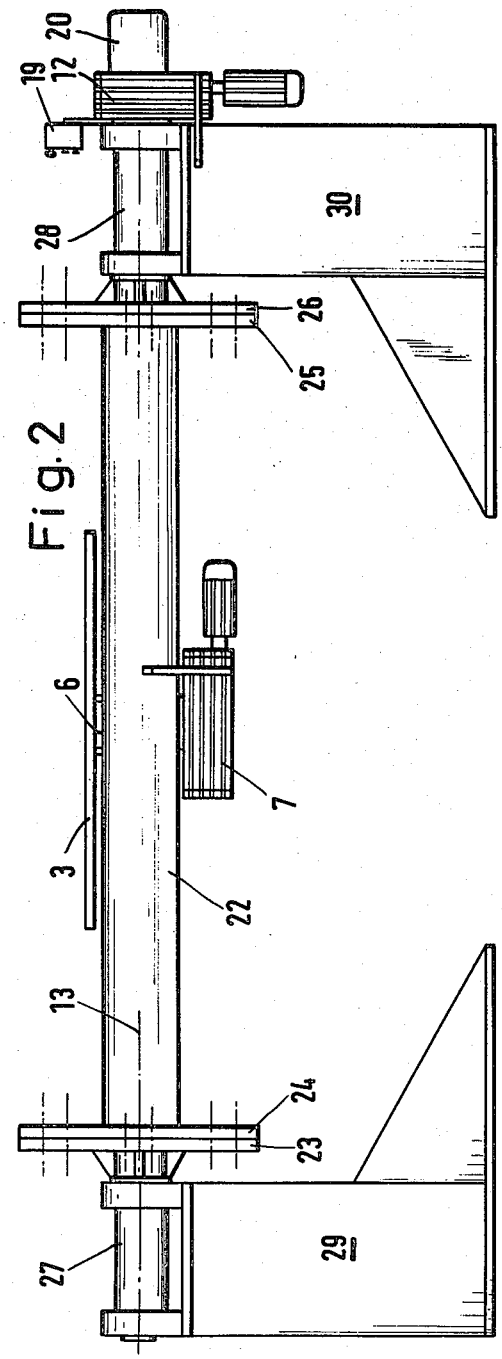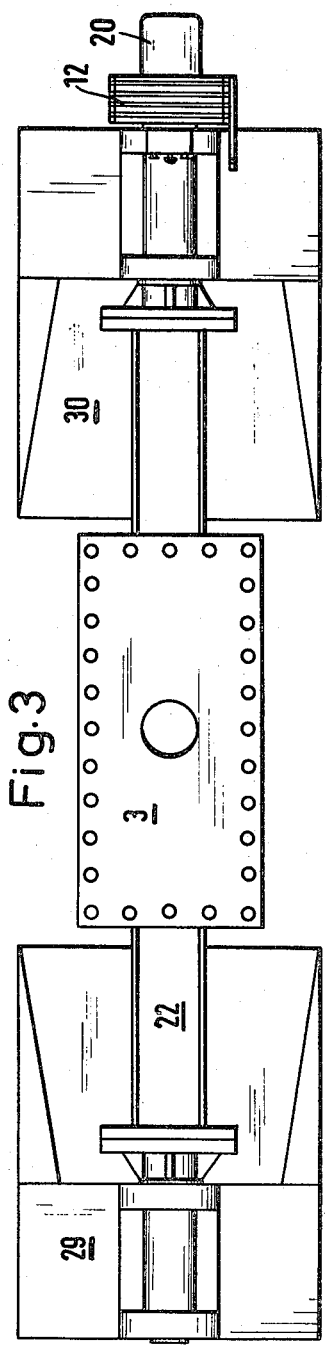

HOLDING DEVICE

The invention relates to a holding device for a workpiece, more particularly a heavy workpiece which is to be subjected to welding.

Holding devices for heavy workpieces are used to clamp workpieces for welding work, preferably in a "trough position", that is to say, with the seam horizontal, to be welded from above so that a trough is formed for the weld metal. In known lifting tables the table top or clamping plate can be raised from a height of about 0.5 m to a height of about 1.80 m, tilted through about 90° and be turned through up to 360° about a vertical axis. With complicated workpieces, however, repeated re-clamping is necessary. This requires time, increases the frequency of accidents and leads to inaccuracies.

There is, therefore, a need for a more comprehensively adjustable holding device which, after the workpiece has once been clamped, makes it possible to adjust the workpiece into any desired position, preferably automatically or under the control of drive elements.

The present invention provides a holding device for a workpiece comprising a stand and a clamping plate mounted on the stand for unrestricted rotation relative to the stand respectively about a horizontal axis and an axis extending normal thereto.

Apart from the economic advantages of using a holding device according to the invention to increase production and improve the quality of welding seams, because the welder can adjust the workpiece into the most favourable "trough position" to form each seam, there is also an increase in safety from accidents because re-clamping of heavy workpieces becomes superfluous and accidents due to the falling or overturning of workpieces are largely eliminated. The wide range of adjustability of the position of the workpiece also brings considerable physical relief to a workman engaged in any form of work on the workpiece with corresponding ergonomic advantages.

A holding device according to the present invention makes it possible, for example, to bring any desired workpiece, which needs to be worked upon with free hands, into any desired working position. Thus, the main use of the device does not lie in fixing a workpiece in a specific position in relation to a tool in order to achieve uniform working accuracy, independent of preliminary work, for example, marking out, but in obtaining an unlimited adjustability of the orientation of a workpiece despite its clamping and to render this adjustment possible at all—particularly with heavy workpieces, because, in many cases, the forces which can be applied by hand to adjust such workpieces no longer suffice for the correct alignment of the workpiece.

It is the clamping devices used in association with the work table—in the present text called a "clamping plate"—which serve to transmit adjustments of the plate about various axes to the workpiece, while the clamping devices themselves must be capable of taking heavy loads, for example, of several tonnes, in every position of the workpiece.

Hitherto, workpiece holding devices for heavy workpieces have provided unlimited rotation of the workpiece about a vertical axis only. Regardless of whether the axis is vertical or horizontal, during the welding of complicated workpieces, for example, the problem will regularly arise of having to produce welding seams in unfavourable positions from the welding point of view. Furthermore, restriction on proper positioning of the workpiece not infrequently requires considerable physical mobility and dexterity from the worker in order to be able to reach all the points to be worked, so that a remedy is required in the interests of facilitating the work and providing protection from accidents. With large workpieces it is often only possible to reach higher working positions with additional aids such as platforms or ladders. As a rule this involves additional physical stress on a workman, particularly as the tool, for example, a welding gun with its supply cables and a welding shield, also have to be lifted to the elevated position.

These disadvantages are overcome by the possibility of rotating the workpiece in all directions. The particular part of the workpiece to be worked is brought into the most favourable position, the worker no longer needs to change his position or only within an easily accessible range, and labour and time are saved.

The clamping plate may be pivotally mounted for rotation about said normal axis at the free end of a cantilever which is pivoted to the stand for rotation about said horizontal axis.

The torque to be applied for turning the cantilever about the horizontal axis depends on the centre of gravity of the combined mass of the cantilever, clamping plate and workpiece in relation to this axis and therefore fluctuates within wide limits according to the weight, size and shape of the workpiece. To provide for balancing or partial balancing of the combined mass, the cantilever may be pivoted to the stand via two elements adjustably secured together in face-to-face relation so as to be relatively displaceable with respect to one another in at least one direction in a plane normal to said horizontal axis.

Preferably, said elements are relatively displaceable with respect to one another in two directions at right angles in a plane normal to said horizontal axis.

By adjusting these elements, and hence the position of the cantilever, the necessary torque for turning the cantilever about the horizontal axis can be reduced, and also the structural strength of the associated components of the holding device including any drive.

A holding device according to the invention may comprise an electric motor drive for rotating the clamping plate about said horizontal axis and a slip-ring device to supply electrical current thereto.

Drive means may be provided for rotating the clamping plate about said horizontal axis and about said normal axis and limit switches for interrupting the operation of each drive means.

In this manner, rotary movement both of the cantilever and of the clamping plate may be brought automatically to a standstill at any desired point when a drive is used, preferably an electric drive.

For this purpose, limit switches may be operated by stops mounted on rotatable parts. Thus, the pivots may be provided at their periphery with limit switches which are either fixed or displaceable in the peripheral direction so that they can be adjusted for any angle of rotation. When a particular drive is switched on, the limit switch moves with the pivot until a stop is reached and the circuit is interrupted. Naturally, it is also possible, and in some circumstances it is preferable, to secure the stop firmly or adjustably to the pivot and to secure the limit switch immovably to the stand or to the cantilever, as appropriate.

In the normal case, electric drives or associated gearing may be reversible. The rotary movement can thus be interrupted at any desired point after rotation in a selected direction. In full rotation of the cantilever is not necessary, any electric leads to a clamping plate drive means may simply comprise a sufficiently resilient cable of adequate length, rather than slip-rings and brushes.

For very heavy workpieces, the present invention provides a holding device in which the clamping plate is pivotally mounted about said normal axis to a cross bar which is pivoted to the stand at both ends for rotation about said horizontal axis.

Such a cross bar construction avoids the use of a massive cantilever structure for heavy loads and saves costs in the construction of the holding device.

The larger form of construction and, in some circumstances, the longer distances to the working positions through which a workman has to move when it is necessary to pass round the workpiece from one side of the cross bar to the other, are, of course, drawbacks to this construction.

Optional features described with reference to the cantilevered construction of holding device according to the present invention may be applied equally to the construction of device using a cross bar supported at both ends.

Specific embodiments of the present invention will now be described by way of example, and not by way of limitation, with reference to the accompanying drawings in which:

FIG. 2 is a side view of a further holding device according to the present invention; and FIG. 3 is a plan view of the device shown in FIG. 2.

Figure 1:
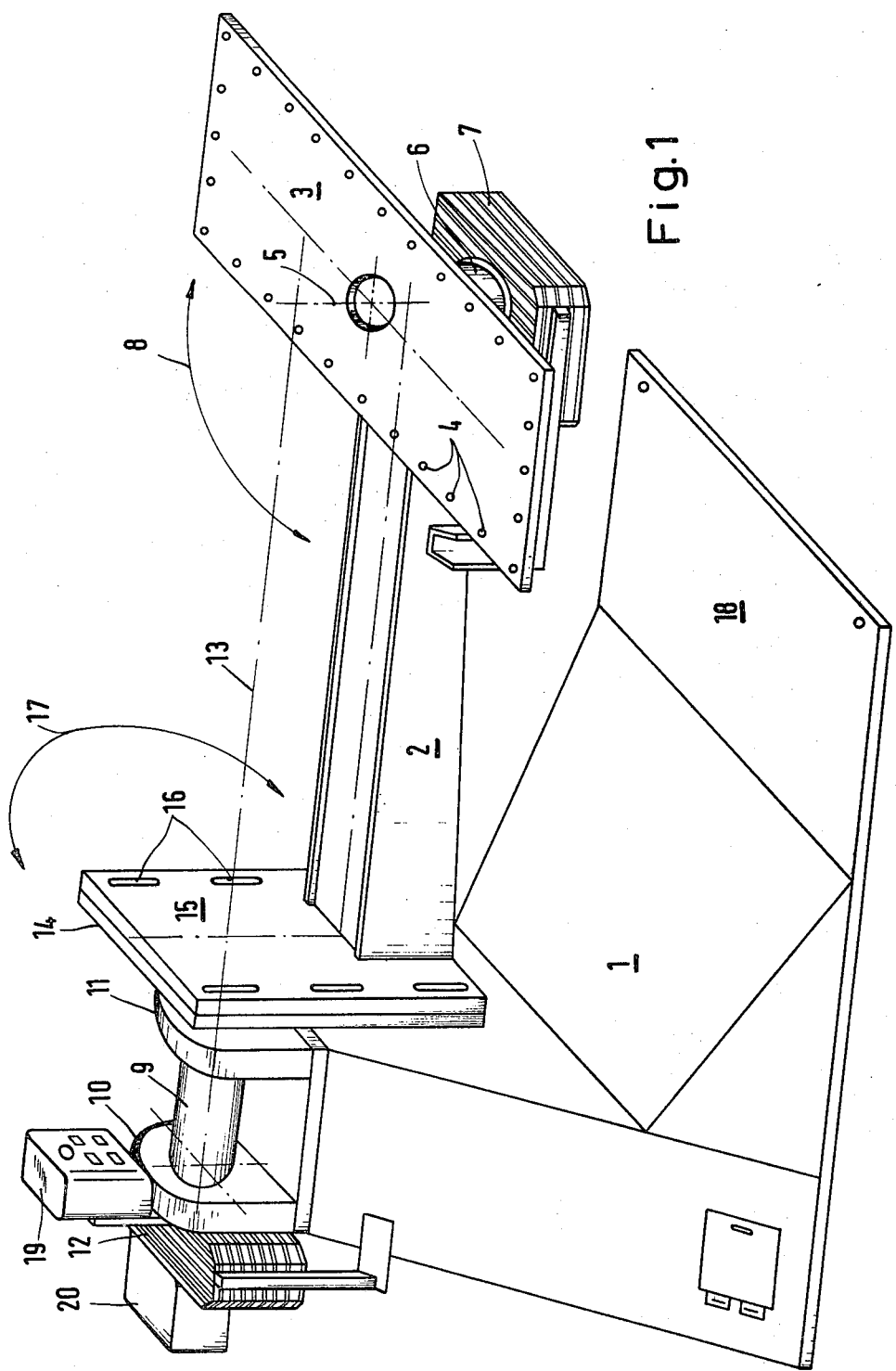
FIG. 1 is a perspective view of a holding device according to the present invention.

With reference now to the accompanying drawings and first to FIG. 1, the holding device, which is for holding heavy workpieces, comprises three main parts which are movable in relation to one another, these being a stand 1, a cantilever 2 and a clamping plate 3. The clamping plate 3 is constructed to receive a workpiece and it may comprise clamping holes 4 and also mounting holes, and bolts or other clamping elements of known kind for use in locating a workpiece quickly, simply and securely on the clamping plate 3.

The clamping plate 3 is mounted for rotation on the cantilever 2 about a preferably central vertical axis 5 extending perpendicular to the clamping plate. For this purpose it has, at its under side, a pivot pin 6 which engages through a bearing, not illustrated, in the cantilever 2. The end of the pivot pin 6 remote from the clamping plate 3 is connected to a geared motor 7 which is located on the cantilever 2 and which renders possible an unlimited rotation of the clamping plate in both directions about the axis 5 as indicated by the double arrow 8. The motor 7 is preferably an electric motor having leads taken along the cantilever 2. It is understood that a different form of drive, for example, an hydraulic drive, may also be used for rotating the clamping plate about the axis 5.

The motor 7 has a reduction gear and is flange mounted on the lower end of the pivot pin 6.

The cantilever extends from the stand 1 to the clamping plate 3 in the horizontal direction and is mounted on the stand by means of a pivot pin 9 pivoted in bearings 10 and 11 on the stand. A geared motor 12, preferably of the same kind as the geared motor 7, drives the end of the pivot pin 9 remote from the clamping plate to rotate the cantilever 2 about the longitudinal, horizontally extending axis 13 of the pivot pin 9.

Interposed between the cantilever 2 and the pivot pin 9 are two vertical flange elements 14, 15 which are aligned perpendicular to the pivot pin 9 and which are displaceable in face-to-face relation with respect to one another to permit an alteration in the offset position of the cantilever 2 in relation to the pivot pin 9. The flange 15 has vertically extending slots 16 through which bolts or the like clamping elements (not illustrated) engage, these bolts being secured in the flange 14 or engaging through the latter to bear against the back of the flange 14. Accordingly, in the position of rest of the device as illustrated, the cantilever 2 can be displaced vertically upwardly or downwardly towards or away from the axis 13. A corresponding horizontal displacement of the cantilever 2 can also be made possible by providing the flange 14 with horizontally directed slots.

This adjustability of the position of the cantilever 2 in relation to the axis 13 enables the cantilever 2 together with the clamping plate 3, and a workpiece secured thereto, to be balanced with respect to the axis of rotation 13 by moving the centre of gravity of the rotatable mass onto that axis. This frees the pivot pin 9 and in particular the geared motor 12 from moments caused by the weight of the rotatable mass when the cantilever 2 is swung about the axis 13 in the direction of a double arrow 17 and makes it possible to lighten the construction of the cantilevered parts and of the geared motor 12.

The stand 1 consists of a closed frame member which widens out towards the ground, at first transversely to the direction of the cantilever, and then also in the direction of the cantilever, to form at the bottom, with a large base plate 18, a stable supporting surface.

The holding device described above with reference to FIG. 1 renders possible an unlimited rotational mobility of the clamping plate 3, and hence of a workpiece secured to the clamping plate 3, about two axes 5 and 13 at right angles and one of which is horizontal, so that during welding work on the workpiece, for example, each welding seam can be brought into a "trough position", that is to say, into a horizontal position accessible from above. This is a decisive advantage in facilitating welding work and ensuring the quality of such work.

The operation of the holding device can be simplified and made more precise by additional control means. A switch box 19 at the top of the stand makes possible the manual control of rotary movements executed by the geared motors 7 and 12. In addition, control means (not illustrated) may be provided operating between the pins 6 and 9 on the one hand and the cantilever 2 and the stand 1 on the other hand, to switch off the motors 7 and 12 when predetermined rotary positions are reached. For example, stops, which are rotationally adjustable in the peripheral direction, may be provided on the pins 6 and 9 and limit switches which are actuated by the stops may be provided on the cantilever 2 and the stand 1 adjacent the bearings of these pins. It is to be understood that other indicators of angles of rotation of known kind may also be used to effect such additional controls.

If the cantilever 2 has to be able to execute any desired number of rotations one after the other about its axis of rotation 13, the current transmission to the geared motor 7 on the cantilever is effected by means of a set of slip-rings disposed in a slip-ring housing 20 at the end of the pivot pin 9, there being stationary brushes in the housing bearing against the slip-rings. If partial rotations of the cantilever 2 are sufficient for the operation, however, the current transmission can be effected by cables.

The holding device shown in FIGS. 2 and 3 differs essentially only in that instead of a cantilever 2 it comprises a cross bar 22 rotatively supported at both ends and which carries the pivotal clamping plate 3 between its ends. Such mounting at both ends enables the cross bar to support particularly heavy workpieces, for which a cantilever mounting would be too massive and expensive. Apart from this, fundamentally similar components may be used as in the device according to FIG. 1, such as the pivot pin 6 and motor 7, the flange elements 23, 24, 25, 26 now provided at both sides of the clamping plate 3, which render possible an adjustment of the cross bar in relation to the axis of rotation 13, pivot pins 27 and 28 for rotatably mounting the cross bar 22 horizontally, and a stand made up of two frames 29 and 30 for supporting the cross bar 22 in relation to the ground. The frames 29 and 30 are preferably alike in their construction. They may be constructed like the single frame 1 making up the stand in FIG. 1, so as to unify the frame construction—although the frames 29 and 30 do not have to take up any overhanging moments. The other components (except the cross bar 22) may also be constructed like their corresponding components in FIG. 1. Thus, the pivot pins 27 and 28 may be the same as the pin 9, and the geared motor 12 on the frame 30 for rotating the cross bar 22 may be powered via a slip-ring device 20 which is associated with the pin 28. Also, a corresponding switch box 19 may be provided on the frame 30.

I claim:

1. A holding device for enabling heavy workpieces of the order of several tons to be oriented without reclamping into any position so that welding seams in the workpiece may be favorably welded horizontally from above, comprising a frame, a first rotary support means mounted on said frame for rotation about a fixed horizontal axis, said first rotary support means comprising a first vertically disposed flange which is rotated about said fixed horizontal axis, a second vertically disposed flange mounted face-to-face on said first flange, mounting means on said first and second flanges for adjusting their relative mounting positions such that said second flange is displaceable relative to said first flange in a direction perpendicular to said fixed horizontal axis such that said second flange is mountable on said first flange at different positions relative to said first flange, a third rotary support means having an axis of rotation coincident with said fixed horizontal axis of said first rotary support means, said third rotary support means comprising a third vertically disposed flange rotatable about said fixed horizontal axis, a fourth vertically disposed flange mounted face-to-face on said third flange, additional mounting means for adjusting their relative mounting positions such that said fourth flange is displaceable relative to said third flange in a direction perpendicular to said fixed horizontal axis such that said fourth flange is mountable on said third flange at different positions relative to said third flange and in a direction perpendicular to said fixed horizontal axis, a support arm having one end mounted on said second vertical flange and extending generally horizontally from said second vertical flange, said support arm having its other end mounted on said fourth flange, and a second rotary support means mounted on said support arm, said second rotary support means comprising a clamping plate on which said workpiece is clamped and a drive means for rotating said clamping plate about a rotary axis which is perpendicular to said fixed horizontal axis, whereby said clamping plate has unlimited rotational mobility and hence also the workpiece clamped thereto so that each welding seam on the workpiece may be disposed in a horizontal position and the seams in the workpiece may be favorably welded from above while such seams are horizontally disposed.

2. A holding device according to claim 1 wherein said second flange is adjustable relative to said first flange in two directions perpendicular to one another.

3. A holding device according to claim 1 wherein said fourth flange is adjustable relative to said third flange in two directions perpendicular to one another.

* * * * *